United States Patent [19]
Dent

[11] Patent Number: 5,790,549
[45] Date of Patent: Aug. 4, 1998

[54] SUBTRACTIVE MULTICARRIER CDMA ACCESS METHODS AND SYSTEMS

[75] Inventor: Paul W. Dent, Stehags, Sweden

[73] Assignee: Ericsson Inc., Research Triangle Park, N.C.

[21] Appl. No.: 608,809

[22] Filed: Feb. 29, 1996

[51] Int. Cl.$^6$ .................................................. H04J 13/00
[52] U.S. Cl. .................... 370/479; 370/320; 370/335; 370/342; 375/205
[58] Field of Search .................... 370/479, 330, 370/335, 337, 347, 358, 484, 320, 342, 441; 455/239.1; 375/200, 205, 206

[56] References Cited

U.S. PATENT DOCUMENTS

| | | | |
|---|---|---|---|
| 5,005,171 | 4/1991 | Modisette, Jr. et al. | 370/358 |
| 5,151,919 | 9/1992 | Dent | 375/200 |
| 5,218,619 | 6/1993 | Dent | 375/200 |
| 5,412,690 | 5/1995 | Kotzin et al. | 370/484 |
| 5,559,838 | 9/1996 | Nakagoshi | 370/347 |
| 5,617,060 | 4/1997 | Wilson et al. | 455/239.1 |
| 5,642,356 | 6/1997 | Wenk | 370/337 |

FOREIGN PATENT DOCUMENTS

| | | | |
|---|---|---|---|
| 210 698 | 2/1987 | European Pat. Off. | H04Q 7/04 |
| 599 632 | 6/1994 | European Pat. Off. | H04L 12/28 |
| 680 168 | 11/1995 | European Pat. Off. | H04J 14/02 |
| WO92/06546 | 4/1992 | WIPO | H04J 4/00 |
| WO94/11961 | 5/1994 | WIPO | H04J 1/00 |

OTHER PUBLICATIONS

"Optimum Multiuser Asymptotic Efficiency", Sergio Verdu, *IEEE Transactions on Communications*, vol. COM–34, No. 9, Sep. 1986.

International Search Report re PCT/US97/02661 Date of mailing of search report: 27 Jun. 1997.

L. E. Varakin et al., "Multifrequency Digital Signal Systems", *Elektrosvyaz*, vol. 28, No. 7, ISSN 0013–5771, pp. 58–62 (1974).

H. Azad et al., "Multirate Spread Spectrum Direct Sequence CDMA Techniques", *IEEE Colloquium on Spread Spectrum Techniques for Radio Communications Systems* (Digest No. 95), pp. 4/1–4/5 (27 Apr. 1993).

*Primary Examiner*—Douglas W. Olms
*Assistant Examiner*—Shick Hom
*Attorney, Agent, or Firm*—Burns, Doane, Swecker & Mathis, L.L.P.

[57] ABSTRACT

Apparatuses and methods for practicing subtractive multicarrier CDMA techniques are disclosed. A channel is divided into a plurality of contiguous subchannels, wherein in each subchannel an amount of spreading is reduced in accordance with the number of subchannels. The channel can be divided into a Plurality of timeslots and a fraction of the total number of conversations sharing the channel can be allocated to each timeslot. A radio communications device, using such a method, can employ one timeslot for transmission and another time slot for reception.

29 Claims, 3 Drawing Sheets

FIG. 1

MULTICARRIER (8 FREQUENCIES) X 8-TIMESLOT TDMA FORMAT

FIG. 2

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | S |
|---|---|---|---|---|---|---|---|---|---|---|---|---|---|---|---|---|---|---|---|---|---|---|---|---|---|---|
| A | | | | | | | | | | | | | I | | | | | | | | | | | | | |
| CC | | | | | | | | | | | | | I | | | | | | | | | | | | | |
| H | | | | | | | | | | | | | I | | | | | | | | | | | | | |

SUBTRACTIVE MULTICARRIER CDMA ACCESS METHODS AND SYSTEMS

BACKGROUND

The present invention relates generally to the field of mobile radio-communications systems, such as cellular systems, that employ Code Division Multiple Access (CDMA) and use interference subtraction or cancellation to raise multi-user capacity.

Conventional spread spectrum systems, including CDMA systems, have a limit on the number of simultaneous conversations per cell per unit bandwidth determined by self-interference. Improved CDMA systems using interference cancellation or subtraction have been developed for overcoming this capacity limit, however the signal processing effort that must be expended in such a receiver increases with at least the cube of the bandwidth.

The U.S. wideband cellular standard EIA/TIA IS-95 describes a CDMA system having instantaneous bandwidths on the order of 1 MHz that can support several conversations in the same bandwidth and location. The IS-95 standard further describes a CDMA system which employs continuous transmission and reception and requires an expensive diplexing filter to couple the transmitter and receiver to the same antenna. By contrast, the European standard, GSM, defines a Time Division Multiple Access (TDMA) system whereby time-slotted transmission is employed to accommodate eight users in the same 200 KHz channel, and each uses a transmit timeslot that is offset from the receive timeslot to avoid needing a diplexing filter. Instead of the expensive diplexing filter used in IS-95 compliant systems, these TDMA systems employ a much cheaper and smaller transmit/receive (T/R) switch.

U.S. Pat. No. 5,151,919 entitled "Subtractive CDMA Demodulation" (to Paul W. Dent, issued Sep. 29, 1992), the disclosure of which is incorporated here by reference, describes, among other things, a technique for overcoming the self-interference limit to CDMA capacity by demodulating overlapping CDMA signals iteratively in order of decreasing measured signal strength such that stronger signals are demodulated and subtracted away from the received composite signal before attempting demodulation of weaker signals. U.S. Pat. No. 5,218,619 entitled "Re-Orthogonalization" (to Paul W. Dent, issued Jun. 18, 1993), the disclosure of which is incorporated here by reference, is a continuation-in-part of U.S. Pat. No. 5,151,919 and discloses for example, further subtractions at a later stage in the process of signals already identified and subtracted a first time on an earlier occasion in order to reduce residual subtraction errors.

The exemplary implementations described in the foregoing incorporated patents use digital signal processing for descrambling a signal by use of its known scrambling code, transforming the signal to the spectral domain, and then notching out the spectral component associated with that signal. After notching, the remaining, non-zero components represent the transform of the other signals which have been descrambled with the first signal's code. The remainder is then transformed back to the waveform domain and the descrambling code re-applied to restore the signals to their original domain with one of them now subtracted.

In U.S. Pat. No. 5,218,619, it is disclosed that imperfect signal subtraction caused by errors in the amount of signal subtracted due to interference from other, weaker, overlapping signals may be eliminated by subtracting an already subtracted signal again in suitable amount, after having subtracted some of the other signals. This resubtraction process, commonly referred to as reorthogonalization, can be performed by digital signal processors. However, this technique has the characteristic that the amount of processing increases with at least the cube of the spectrum bandwidth, making this technique costly for wideband signals depending upon processing throughput costs of available processes.

U.S. patent application Ser. No. 08/570,431 entitled "Wideband Re-Orthogonalization" and filed on Dec. 11, 1995 discloses, among other things, a technique for reducing the processing needed to implement interference subtraction in wideband CDMA systems by using some analog signal processing steps. However, analog signal processing is not the most cost-effective technology for implementing small, low-cost mobile phones. U.S. patent application Ser. No. 08/608,811, entitled "Subtractive CDMA/TDMA" discloses an interference-subtractive CDMA system wherein a narrowband CDMA signal is compressed in time into a timeslot increasing its bandwidth for transmission. Upon reception, the signal received in the timeslot is captured in buffer memory. The captured signal may then be played out of the memory at the original narrowband rate such that narrowband interference subtractive CDMA algorithms of acceptable complexity can be used to process the captured signals. Both of the patent applications referred to above are also incorporated by reference herein.

Joint demodulators for simultaneously demodulating or decoding several overlapping CDMA signals are also known. These are sometimes described as multiuser detectors. See for example: "Optimum Multiuser Asymptotic Efficiency" (Sergio Verdhu, Trans IEEE on communications, Vol. COM-34 no. 9, Sept 1986). Joint demodulators tend to increase in complexity with at least the square of the number of users, and when using the optimum Maximum Likelihood Sequence Estimation algorithm, the increase is exponential. Thus joint demodulation does not now provide an acceptable solution to the self-interference capacity limit of CDMA systems.

SUMMARY

The above-described difficulties are alleviated when practicing multi-carrier subtractive CDMA techniques according to the present invention. An exemplary system in accordance with the present invention divides the wideband channel into N subchannels in each of which subchannels the amount of spreading has been reduced by the factor N over that which would have been used in the wideband channel. The signal processing complexity for processing each subchannel using an interference cancellation algorithm reduces faster than N, for example by N-cubed, and the total processing complexity for processing the whole bandwidth comprising all N subchannels thus reduces by N-squared.

Wider bandwidth receivers can be employed in systems incorporating the invention without an undesirable increase in complexity while still providing an advantage of flexible data transmission rates, known as bandwidth on demand. For example, the wideband channel can be divided into M timeslots and a fraction 1/M of the total number of conversations sharing the bandwidth can be allocated to each timeslot. A handheld phone, or radio communications device, using this exemplary method can then employ one timeslot for transmission and a different timeslot for reception in order to share components like the antenna in a more cost-efficient manner. The bandwidth on demand feature may then be provided by allocating multiple timeslots to a particular user if needed to achieve higher data rates, such as the 144 kb/s ISDN rate.

In particular, in accordance with an exemplary method incorporating the invention wherein information is communicated between a first station and a plurality of second stations, each of the plurality of second stations is allocated a frequency band containing a first number of subchannels, at least one timeslot in a repeating time-division multiple access frame period, and an access code. Information is modulated for transmission by the first station to one of the plurality of second stations onto a radio signal using an allocated timeslot, subchannels, and an access code. Modulated signals from the first station are simultaneously transmitted to the second stations that use a same allocated timeslot and have at least some of the first number of subchannels in common. Transmissions are received at one of the plurality of second stations in the allocated timeslot and information intended for the second station is decoded with the aid of the allocated access code.

An exemplary apparatus in accordance with the present invention involves a receiving system for receiving signals in a designated timeslot using plural radio subchannel frequencies in a designated frequency channel and a designated access code. Such a system includes an antenna means for receiving radio signals; receiver means coupled to the antenna means for filtering and amplifying received signals in the designated frequency channel and converting them to a representative stream of numerical samples; frequency decimation means for processing the numerical sample stream to produce separate sample streams, each separate sample stream being representative of the signal in an associated subchannel; subchannel processing means for processing signals in each of the subchannels using the designated access code in order to separate a wanted signal from unwanted signals having other access codes and to produce output information symbols carried by the wanted signal.

BRIEF DESCRIPTION OF THE DRAWINGS

The foregoing, and other objects, features and advantages of Applicant's invention will be apparent from reading this description in conjunction with the drawings, in which:

FIG. 1 depicts a multicarrier timeslot TDMA format in accordance with an exemplary embodiment of the invention;

FIG. 2 depicts a superframe structure in accordance with an exemplary embodiment of the invention.

DETAILED DESCRIPTION

Figure 3:
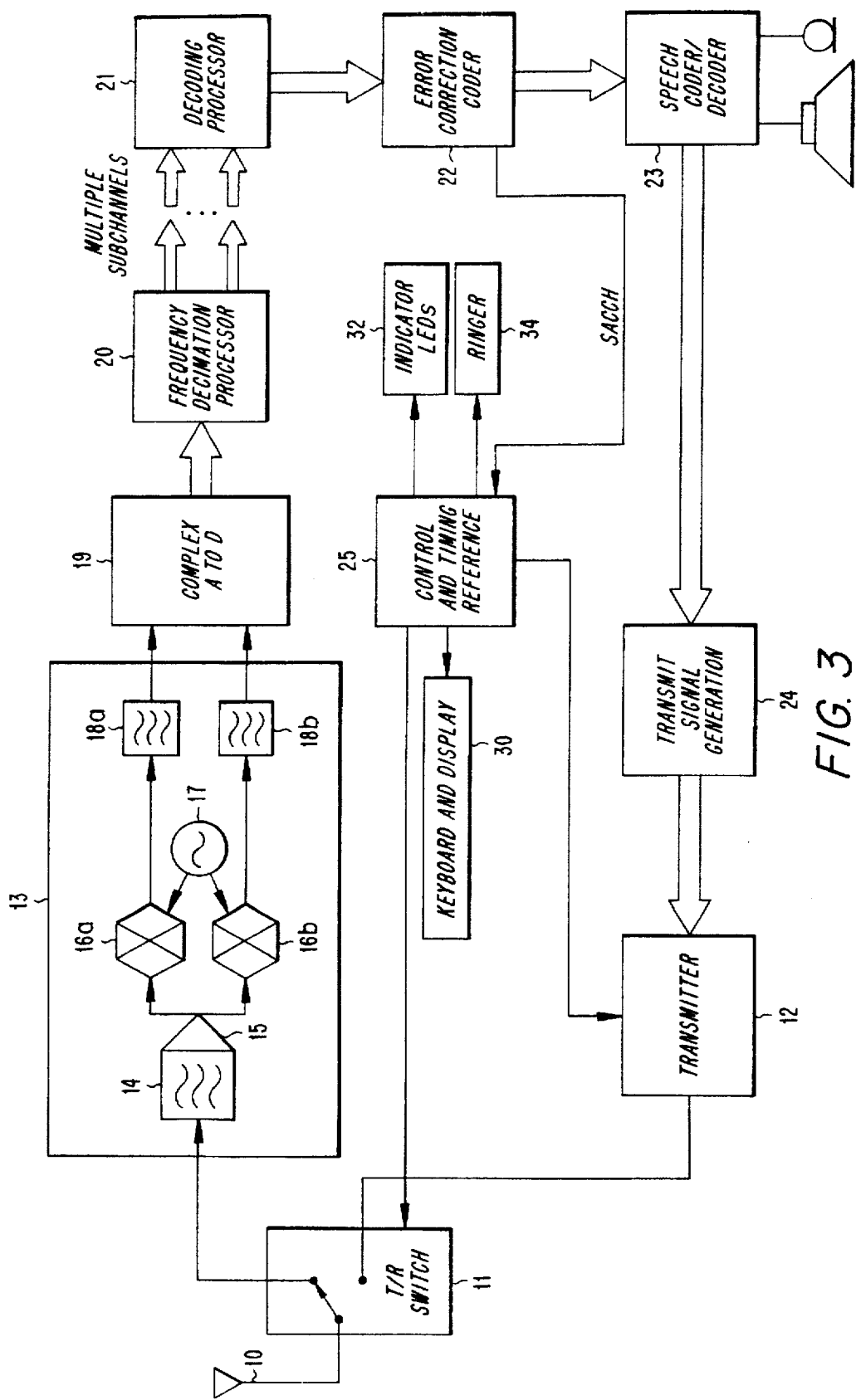
FIG. 3 depicts a mobile terminal circuit block diagram in accordance with an exemplary embodiment of the invention.

A wideband CDMA system, in accordance with the present invention, is constructed by dividing an allocated channel bandwidth (e.g., 800 KHz) into a number N of subchannels (e.g., eight subchannels each having a 100 KHz bandwidth) and a number M (e.g., eight) of timeslots. The limiting case of M=1 corresponds to continuous transmission in N subchannels and is also encompassed by the present invention.

The total channel bandwidth may be shared by L users by allocating a fraction of the timeslots and a fraction of the subchannels to carry traffic for each user. For example, L/M users may be allocated the same timeslot on all N subchannels. Although the allocation of timeslots and subchannels may be made in a variety of ways, this description focuses on the exemplary case where all subchannels are used by each user in a single timeslot, i.e., each user has the same data rate. This choice is made for brevity and simplicity of the description without restricting the scope of the invention. However, the present invention also includes all cases of providing variable data rates when employed with interference reduction, interference-subtractive or joint demodulation algorithms to enhance capacity.

Figure 1:
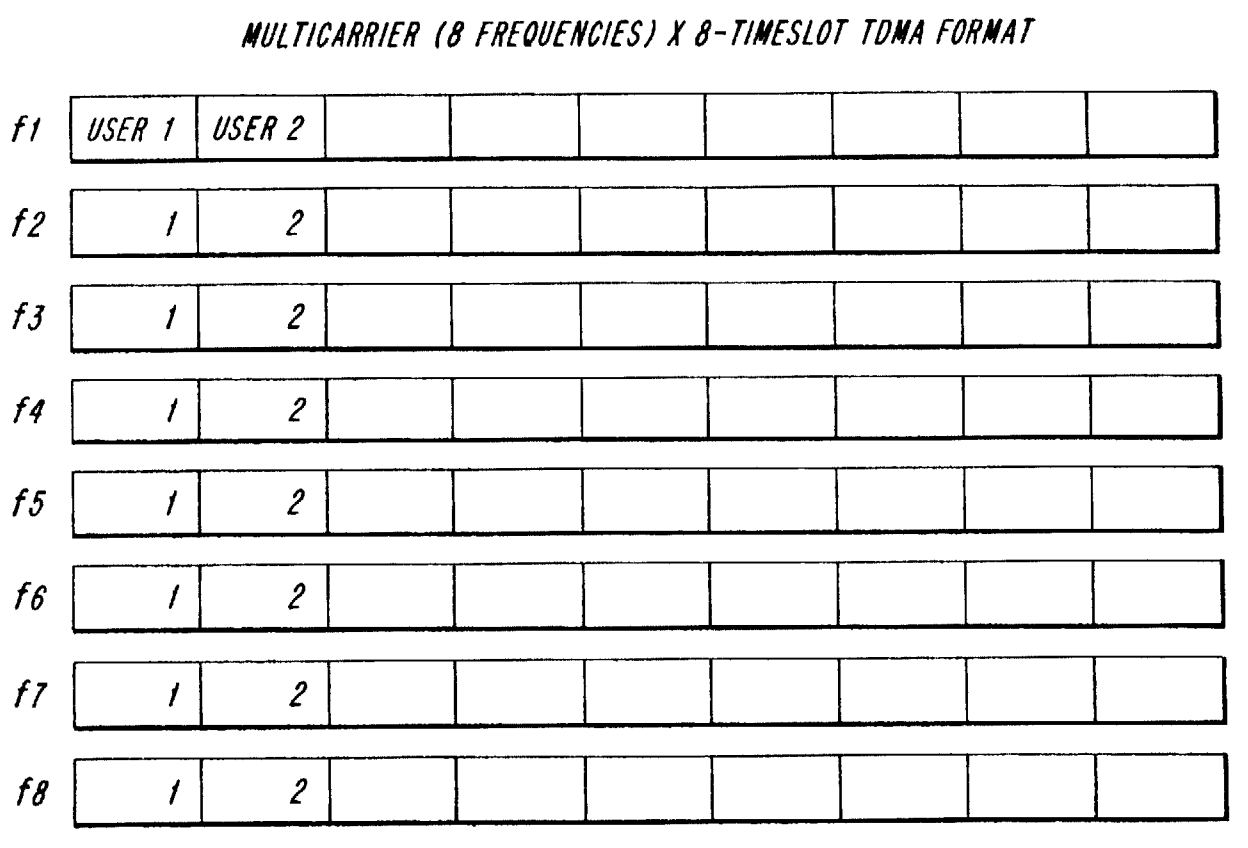

FIG. 1 shows an exemplary signal comprised of eight 100 KHz frequency channels within an 800 KHz total receive bandwidth and divided into eight timeslots of a repeating TDMA frame period. A first user (USER 1) is allocated slot 1 on all eight carriers to receive signals from a base station. A second user (USER 2) is allocated slot 2 on all eight carriers. Other users could be allocated, for example, two slots on all eight carriers to receive twice the data rate or one slot on half the carriers to receive half the data rate.

USER 1 processes eight 100 KHz wide signals received for ⅛th of the time. The amount of processing needed by USER 1 is therefore equivalent to that needed for processing one 100 KHz carrier continuously. This is 512 times less than processing one 800 KHz carrier continuously and 64 times less than processing one 800 KHz carrier for ⅛th of the time, given a cubic relationship between processing power and bandwidth.

Each slot can contain a number of overlapping CDMA signals. Thus, USER 1 can be considered to be "USER GROUP 1" while USER 2 denotes "USER GROUP 2". Each group of overlapping users may contain, for example, up to 10 individual users of which five on average have signals transmitted to them while the other five traffic signals are temporarily silent due to the other party being the active speaker. One of the active signals in each subchannel and slot may be a permanently-transmitted Broadcast Control Channel (BCCH) which is used for alerting idle mobiles to a call from the network and for broadcasting various overhead information, e.g., network and station ID information and information on surrounding base stations.

Some exemplary parameters for an interference-subtractive CDMA system according to the present invention are shown in Table I below.

TABLE I

| PARAMETER | EXEMPLARY VALUE |
| --- | --- |
| Chip rate per 100 KHz subchannel | 135.4166KB/s (13MHz/96) |
| Chip modulation | Offset QPSK |
| Number of chips per slot | 64 |
| Tail chips | 3 + 3 |
| Inter-slot guard time | 8.125 chip periods |
| Number of chip periods per slot | 78.125 |
| Number of slots per TDMA frame | 8 |
| Number of chip periods per frame | 625 |
| User information coding per slot | (64,6) orthogonal Walsh coding |

An exemplary superframe structure composed of 4×26 TDMA frames is shown in FIG. 2. This exemplary superframe structure allocates TDMA frame numbers 1 to 12 to traffic. Frame 13 is not used for transmitting traffic in this exemplary format and is an IDLE frame that the receiver can employ for other purposes such as scanning other base station frequencies to determine if it is desirable to listen to a different control channel. The next 12 frames are also used for traffic and the 26th frame is used to transmit one slot of Slow Associated Control Channel information (SACCH). The SACCH is used to convey less urgent overhead information which is repeated relatively less frequently than other overhead information, e.g., that broadcast on the BCCH. The above format applies to every subchannel in this exemplary embodiment. The format may be synchronized or staggered between the subchannels. The exemplary superframe repetition period of 104 TDMA frames spans 480 mS. One complete SACCH message is therefore transmitted every 480 mS.

The above slot parameters and superframe formats are derived from the GSM digital cellular TDMA system with a view to simplifying the construction of mobile phones that can function in both GSM systems and systems operating in accordance with the present invention. The formats described above, and below, are merely exemplary and are not intended to limit the scope of the invention. They are instead provided to further describe exemplary format organizations in accordance with systems incorporating the present invention.

Over one row of the superframe structure lasting 120 mS, 24 traffic slots are received per subchannel each containing an access code, such as a (64,6) Walsh coded information symbol. Thus, after Walsh decoding of the 64-bit codeword, six bits of information are obtained, giving 6×24 bits per subchannel per 120 mS. The raw information rate is thus 1.2 KB/S per subchannel, or 9.6 KB/S when all eight subchannels are used. The raw information rate of 9.6 KB/S or 192, 6-bit symbols per 120 mS may be error protected using, for instance, Reed-Solomon codes to correct symbol errors or erasures. For example, the 192 symbols can be divided into four groups for coding in the following ways:

63,53 RS coded yielding 53 6-bit decoded symbols
63,53 Rs coded yielding 53 6-bit decoded symbols
63,53 RS coded yielding 53 6-bit decoded symbols
3×6 bits rate ⅓rd yielding 6 decoded bits or 2 per RS block
TOTAL 192 coded symbols yielding 160 decoded symbols per 120 mS or 53×6+2=320 bits per 40 mS The 320 decoded bits per 40 mS give a net decoded information rate of 8 KB/S, and may be used, for example, to transmit digitally coded speech according to the ITU 8 KB/S speech coder standard. The ITU coder transforms standard 64 KB/S u-law companded PCM speech or linear PCM speech at eight kilosamples per second into the reduced data rate of 8 KB/s. The coder operates on 10 mS blocks of speech samples, taking in 80 speech samples at a time and compressing them to 80-bit blocks. Four successive blocks of 80 bits make up the 320 bits transmitted every time a 63,53 RS code is transmitted with two bits left over being transmitted by the rate ⅓rd code. The above coding is merely exemplary of methods for source and error-control coding speech for transmission according to the present invention, and is not meant to restrict or limit the types of systems in which the present invention may be applied. For example, transformations may be performed using Walsh-Hadamard transforms.

Transmitting an ITU coded block of 80 bits using all eight subcarriers and one slot in two consecutive frames introduces little transmission delay. However, in accordance with an exemplary embodiment, it can be preferable to interleave the transmission of speech blocks over longer periods to provide protection against fading. This can be preferable because, for example, the error correction coding operates most effectively when the probability of error is not correlated between successive symbols or symbols within a coded block. This correlation is reduced by spacing the 63 RS coded symbols of one coded block (in the above example) over eight or more frames. In eight frames, 64, 6-bit symbols are decoded from the eight subcarriers. Of these, 63 are applied to the RS decoder while the remaining symbol is applied to the rate ⅓rd decoder. The rate ⅓rd decoder can, for example be configured as six, rate ⅓rd bitwise convolutional decoders operating on each bit of the symbol. The same decoder can be time-shared six times because of the very low information rate of individual bits.

The SACCH and traffic symbols can be interleaved over 25 frames, excluding the IDLE frame. A distinct IDLE frame, in which the receiver receives neither traffic nor SACCH, is desirable so that the receiver has the freedom to perform various functions, e.g., to change which 800 KHz block of eight 100 KHz channels is received during that frame. It is also desirable, although not necessary, to restrict SACCH transmissions to the same frame (e.g., frame 26 in the repeating structure of FIG. 2) so that, during periods of voice inactivity, the other 25 traffic frames need not be transmitted, without disturbing transmission and reception of the SACCH frame. If SACCHs are transmitted even when there is temporarily no traffic for a mobile, the number of SACCHs transmitted can be double the number of traffic frames transmitted in every slot. Thus it can be desirable to stagger the frame used for SACCH from one overlapping signal to another so that all SACCHs are not transmitted in the same frame.

Likewise the IDLE frames can be staggered so that one overlapping signal is silent in successive frames, rather than all being silent in the same frame, e.g., frame 13 in the example of FIG. 2. The staggering of IDLE and SACCH frames evens out the co-channel interference in different frames. The staggering pattern can be coordinated with co-channel transmissions in neighboring cells or sectors, particularly the strongest of them, in order to extend the interference averaging over more than one cell or sector in the same site.

It is also possible to stagger the SACCH transmissions of a single signal so that a SACCH uses, for example, one carrier out of eight on eight successive frames. However, in each timeslot, each subcarrier would then likely contain one overlapping SACCH transmission for a different mobile, and this is perhaps not so convenient for the mobile receiver to handle as when the SACCH in a slot belongs to the same mobile on all eight carriers. Those skilled in the art will appreciate that the particular type of SACCH staggering can be varied to accommodate the needs of a particular system.

A mobile terminal containing an exemplary apparatus according to the present invention is shown in FIG. 3. An antenna 10 is time-shared between transmit and receive functions by T/R switch 11 which is operated at appropriate times by a control and timing unit 25 alternatively to connect the receiver 13 or the transmitter 12 to the antenna 10. The receiver includes, for example, downconversion functionality provided by any suitable circuitry which converts a received signal to the complex baseband, whereupon the signal is digitized to form a stream of complex numbers for processing. For example, the downconversion can be performed by a quadrature downconvertor including receive band select filter 14, low-noise RF amplifier 15, quadrature mixers 16a and 16b and quadrature local oscillator 17 to produce so-called I and Q signals which are low-pass filtered by filters 18a and 18b. In the exemplary case of receiving an 800 KHz bandwidth, the filters 18a, 18b pass signals having a frequency range of 0 to 400 KHz. With an even number of carriers such as eight, if half are on the high side of local oscillator 17 and half on the low frequency side, the DC, or zero frequency, component from the mixers 16a and 16b corresponds to half way between two subchannels, and can be discarded. In this way the DC offset problem associated with direct conversion receivers can be circumvented.

The I and Q signals from the mixers 16a and 16b are digitized using a dual-channel or complex A/D convertor 19. Many other ways of producing a stream of complex numbers representative of a composite received signal are known and may be used as an alternative to that described above. For example, the logpolar technique disclosed in U.S. Pat. No. 5,048,059 to Dent (issued Sep. 10, 1991) may be used, which patent is incorporated entirely herein by reference.

The digitized I,Q streams representative of the sum of the subchannels are processed by a frequency decimation processor 20 to separate the individual subchannels, e.g., eight in this example. The I,Q streams may first be captured in memory (not shown) over the receive timeslot so that subsequent processing by processors 20 and 21, respectively, need not operate in real time. Alternatively, if the frequency decimation processor 20 operates in real time, the output signals of individual subchannels may be memorized instead so that the decoding processor 21 does not have to operate in real time. The decoding processor 21 operates on the subchannel signals from the decimation processor 20 to decode symbols from designated subchannels. The decoding processor 21 may for each channel, implement, for example, an interference-subtractive, iterative CDMA decoding operation as described in U.S. Pat. No. 5,151,919 and U.S. Pat. No. 5,218,619 both of which are incorporated by reference above. These operations decode signals according to signal strength in an order from strongest to weakest, and subtract out already decoded, stronger signals before decoding weaker signals. For example, in some systems the first (i.e., strongest) signal to be decoded and subtracted by the decoding processor 21 may be a pilot signal modulated with a fixed access code. In other systems, the first and strongest signal to be decoded may be a broadcast control channel (BCCH) which carries various overhead messages, e.g., paging or call alert messages directed to individual receivers. Moreover, in systems having both a pilot signal and a BCCH, the pilot signal can be decoded first followed by the BCCH.

Alternatively, the decoding processor 21 may implement a joint decoding technique in which several overlapping signals are decoded simultaneously. Known techniques for joint demodulation include, for example, decorrelation techniques that perform matrix multiply operations to remove the effect of each signal mutually upon the others. Another technique is a partial decorrelation algorithm in which the effect of weaker signals on the strongest is reduced by decorrelation, the strongest is quantized to a decoded symbol, the decoded symbol is subtracted from the remainder leaving the second strongest signal, and then the process iterates to decode the second strongest signal and so forth. Yet another technique which may be used is the Viterbi sequential maximum likelihood sequence estimation algorithm in which one symbol for each overlapping signal is hypothesized and all possible hypotheses are tested. The hypothesis which best predicts the received signal in a subchannel is then retained to yield a jointly decoded symbol for each of the overlapping signals.

Output symbols from the decoding processor 21 that are intended for the mobile terminal (of FIG. 3) in question may be further processed by an error correction coder 22 which may, for example, include Reed-Solomon decoding as discussed above. Reed-Solomon decoding is particularly appropriate when the symbols decoded by the first stage processor 21 are multi-bit symbols. A Reed-Solomon decoder can bridge a certain number of erroneous symbols that the decoding processor 21 is prone to output due to noise or co-channel interference, but can bridge twice as many "erased" symbols when decoding processor 21 provides an erasure or symbol reliability indication along with each symbol. Error corrected symbols from the coder 22 comprise either digitized voice, in which case they are fed to a speech coder/decoder 23, or signalling messages such as those found on the slow associated control channel (SACCH), which are fed to a control processor 25. The control processor also coordinates user inputs and outputs via keyboard and display 30, LEDs 32 and ringer 34.

In an exemplary embodiment, the speech coder/decoder 23 also codes speech for transmission. Coded speech can be error correction coded and converted to the transmit signal format in transmit signal generator unit 24, and then modulated and converted to the final frequency for transmission in transmitter 12. The control processor 25 controls phases of transmit and receive including switching the T/R switch 11 to connect the antenna 10 to the transmitter 12 and enabling the transmitter 12 during transmit slots. The waveform transmitted by the mobile unit according to this invention is not necessarily the same as that received. For example, U.S. patent application Ser. No. 08/179,954 entitled "Hybrid Access Methods" (to Paul W. Dent, filed Jan. 11, 1994 U.S. Pat. No. 5,539,730), incorporated herein by reference, discloses reasons why mobile communications are asymmetrical in the up- and down-links, and discloses how different types of uplink channels (i.e., FDMA) may be advantageously associated to downlink channels using a different access method (e.g. CDMA or TDMA). In accordance with the present invention, the multichannel CDMA/TDMA downlink method can be associated with an uplink access method having a TDMA element, so as to preserve the mobile unit's characteristic of not needing to transmit and receive at the same time, allowing the T/R switch 11 to be used to share the antenna 10. The transmitter could, for example, be implemented as an 800 KHz CDMA/TDMA system having eight timeslots without using multicarrier decimation, a 400 KHz subtractive CDMA system in which transmission occurs for four out of the eight downlink slots, or a 200 KHz subtractive CDMA system in which transmission occurs for all of the seven downlink slots for which the receiver is not receiving. The uplink and downlink capacity should be the same, but it is not as important to minimize processing effort in the base station where power, size and cost are not as much at a premium as in a handportable, battery-operated mobile phone.

Systems in accordance with the present invention relate principally to mobile communications in the base-to-mobile direction (downlink), but may also be used in the mobile-to-base direction (uplink). However transmitter efficiency trade-offs, as well as factors mentioned in the incorporated patents and patent applications, may suggest constant envelope modulation during mobile transmit bursts. A method incorporating the invention used for downlink is not limited to being associated with a particular uplink method and the invention when used as in the uplink is not limited to use with a particular downlink method.

The invention has been described with reference to exemplary embodiments. However, it will be appreciated by those skilled in the art that it is possible to embody the invention in specific forms other than those of the exemplary embodiments described above. Therefore, the exemplary embodiments described herein are merely illustrative and should not be considered restrictive in any way. The scope of the invention is given by the appended claims, rather than by the preceding description, and all variations and equivalents which fall within the range of the claims are intended to be embraced therein.

What is claimed is:

1. A method of communicating information between a first station and a plurality of second stations, said method comprising:
   allocating to each of said plurality of second stations a frequency band containing a first number of subchannels, at least one timeslot in a repeating time-division multiple access frame period, and an access code;
   modulating information for transmission by said first station to one of said plurality of second stations onto a radio signal using said allocated timeslot, subchannels and access code, wherein each subchannel carries substantially the same information for said one of said plurality of second stations;
   simultaneously transmitting modulated signals from said first station to said second stations that use a same allocated timeslot and have at least some of said first number of subchannels in common; and
   receiving said transmissions at said one of said second stations in the at least one allocated timeslot and decoding information intended for said one of said second stations using the allocated access code.

2. A receiving system for receiving signals in a designated timeslot using plural radio subchannel frequencies in a designated frequency channel, and a designated access code, said receiving system comprising:
   antenna means for receiving radio signals;
   receiver means coupled to said antenna means for filtering and amplifying said received radio signals in said designated frequency channel and converting said received radio signals to a stream of numerical samples;
   frequency decimation means for processing said numerical sample stream to produce separate sample streams, each separate sample stream being representative of a signal in an associated subchannel, each subchannel having substantially the same information; and
   subchannel processing means for processing signals in said associated subchannel using said designated access code to separate a wanted signal from unwanted signals having other access codes and to produce output information symbols carried by said wanted signal.

3. The receiving system according to claim 2 wherein said subchannel processing means includes interference reduction means to process an unwanted signal by using its designated access code to reduce an interfering effect when processing said wanted signal using the access code of the wanted signal.

4. The receiving system according to claim 3 in which said interference reduction means includes means for processing signals in descending signal strength order.

5. The system according to claim 4 in which the strongest signal first processed is a pilot signal modulated with a fixed access code.

6. The system according to claim 4 in which the strongest signal first processed is a broadcast control channel signal carrying call alert messages addressed to individual receivers.

7. The system according to claim 5 in which the second strongest signal is a broadcast control signal carrying call alert messages addressed to individual receivers.

8. The system according to claim 3 in which said interference reduction means includes:
   signal transforming means using the access code of a first signal to perform a transform of received signals to a transform domain;
   nulling means to set a component in said transform domain corresponding to said first signal to zero; and
   inverse transforming means for using said access code and proceeding to decode a second signal using its access code.

9. The system according to claim 8 in which said transforming means performs a Walsh-Hadamard transform.

10. The system according to claim 8 in which said transform domain is the frequency domain.

11. The system according to claim 10 in which said transform domain component set to zero by said nulling means is a DC or zero-frequency component.

12. The system according to claim 3 in which said interference reduction means is a joint demodulation means that decodes at least two signals simultaneously using their designated access codes in combination.

13. A method according to claim 1 including the step of:
   allocating timeslots for transmission from one of said plurality of second stations to said first station which are offset in time from said at least one timeslot that is allocated for reception by said one of said plurality of second stations.

14. The method according to claim 1 in which said step of allocating further comprises the step of:
   selecting a number of said subchannels and timeslots allocated to one of said second stations based on a desired information transmission rate to provide a bandwidth-on-demand capability.

15. A method of communicating information between at least one of a plurality of base stations and at least one of a plurality of mobile stations, said method comprising the steps of:
   allocating, to each of said at least one of said plurality of mobile stations, a frequency band containing a number of subchannel frequencies;
   modulating information for transmission by said at least one base station to said at least one mobile station onto a radio signal which includes said subchannel frequencies;
   transmitting said information-modulated radio signal to said at least one mobile station;
   receiving said transmission at said at least one mobile station together with signals transmitted to other mobile stations that at least partially overlap in some of said subchannel frequencies; and
   processing each subchannel using interference-reduction processing to reduce interference in each subchannel separately, each subchannel containing substantially the same information.

16. The method according to claim 15 in which said step of interference-reduction processing further comprises jointly demodulating at least two overlapping signals.

17. The method according to claim 15 in which said step of interference-reduction processing further comprises demodulating an interfering signal in a subchannel and then subtracting the demodulated, interfering signal before proceeding to demodulate a wanted signal in the subchannel.

18. The method of claim 15 in which said step of allocating further comprises the step of:
   allocating frequency bands to mobile stations which are any one of overlapping, partially overlapping and non-overlapping.

19. A receiver for receiving radio transmissions in which information is modulated onto multiple frequency subchannels within a frequency channel comprising:
   local oscillator means for generating a local oscillator signal having a frequency which is between frequencies associated with two of said multiple frequency subchannels;

quadrature downconversion means for converting a received signal to I and Q quadrature baseband signals using said local oscillator signal; DC offset removal means for processing said I and Q signals to remove unwanted DC offsets therefrom; and A-to-D conversion means for receiving said processed I and Q signals from said DC offset removal means and converting said processed I and Q signals to digital representation.

20. A method of communicating information between a first station and a plurality of second stations, said method comprising:

dividing an allocated channel bandwidth into a plurality of subchannels, each subchannel having a plurality of timeslots;

grouping said plurality of timeslots in each subchannel into a repeating frame structure;

allocating to each of said plurality of second stations at least one of said plurality of time slots on at least one of said plurality of subchannels and an access code;

assigning, for each of said plurality of second stations, a frame in said repeating frame structure of each subchannel for transmitting overhead information from said first station; and transmitting said overhead information in said assigned frames.

21. The method of claim 20, wherein said overhead information is slow associated control channel (SACCH) information.

22. The method of claim 20, wherein said assigned frame for one of said plurality of second stations is different from said assigned frame for another of said plurality of second stations.

23. The method of claim 20, wherein said frames assigned to each of said plurality of second stations are staggered within said repeating frame structure.

24. The method of claim 20, wherein said frame assigned to one of said plurality of second station is different for each subchannel allocated to said one of said plurality of second stations.

25. The method of claim 20, wherein said frame assigned to one of said plurality of second station is the same for each subchannel allocated to said one of said plurality of second stations.

26. A method of communicating information between a first station and a plurality of second stations, said method comprising:

dividing an allocated channel bandwidth into a plurality of subchannels, each subchannel having a plurality of timeslots;

grouping said plurality of timeslots in each subchannel into a repeating frame structure;

allocating to each of said plurality of second stations at least one of said plurality of timeslots on at least one of said plurality of subchannels and an access code;

assigning, for each of said plurality of second stations, a frame in said repeating frame structure of each subchannel in which said first station does not transmit to said second station; and transmitting said signals to said second stations in said respective allocated at least one timeslots other than those associated with said assigned frame.

27. The method of claim 26, wherein said assigned frame is the same frame within said repeating frame structure for each of said plurality of second stations.

28. The method of claim 26, wherein said assigned frame for at least one of said plurality of second stations is different from said assigned frame for another of said plurality of second stations.

29. The method of claim 26, wherein said frames assigned to said plurality of second stations are staggered within said repeating frame structure.

* * * * *